United States Patent

[11] 3,603,240

| [72] | Inventor | Robert McCarthy<br>Seattle, Wash. |
|---|---|---|
| [21] | Appl. No. | 873,035 |
| [22] | Filed | Oct. 31, 1969<br>Division of Ser. No. 500,522, Oct. 22, 1965,<br>Pat. No. 3,476,569 |
| [45] | Patented | Sept. 7, 1971 |
| [73] | Assignee | EEFP Corporation<br>Seattle, Wash. |

[54] MEAT TREATING APPARATUS
7 Claims, 12 Drawing Figs.

[52] U.S. Cl. .................................................. 99/251,
99/356, 99/359
[51] Int. Cl. .................................................. A23l 3/00
[50] Field of Search .................................................. 141/81;
53/127; 99/151, 111, 182, 188, 249, 251, 359,
360, 367, 370, 355, 356

[56] References Cited
UNITED STATES PATENTS

| 1,252,865 | 1/1918 | Thompson .................... | 99/188 X |
| 2,058,849 | 10/1936 | Bergen .......................... | 99/188 UX |
| 2,411,188 | 11/1946 | Borg .............................. | 99/188 |
| 2,520,719 | 8/1950 | Hanson ......................... | 99/251 X |

Primary Examiner—Billy J. Wilhite
Attorney—Graybeal, Cole & Barnard

ABSTRACT: Pieces of raw meat are placed into containers, are subjected to subcook heating and/or pressure, and are then promptly subjected to vacuum extraction, causing removal of melted fats and various enzymic liquescent constituents from the uncooked meat. Next the meat is seasoned and/or preserved in such containers. Steam injection is used to provide both heat and pressure. The steam is both introduced into and exhausted out from a container through a head assembly which covers the open top of the container.

PATENTED SEP 7 1971 3,603,240

INVENTOR.
ROBERT McCARTHY

Graybeal, Cole & Barnard
ATTORNEYS

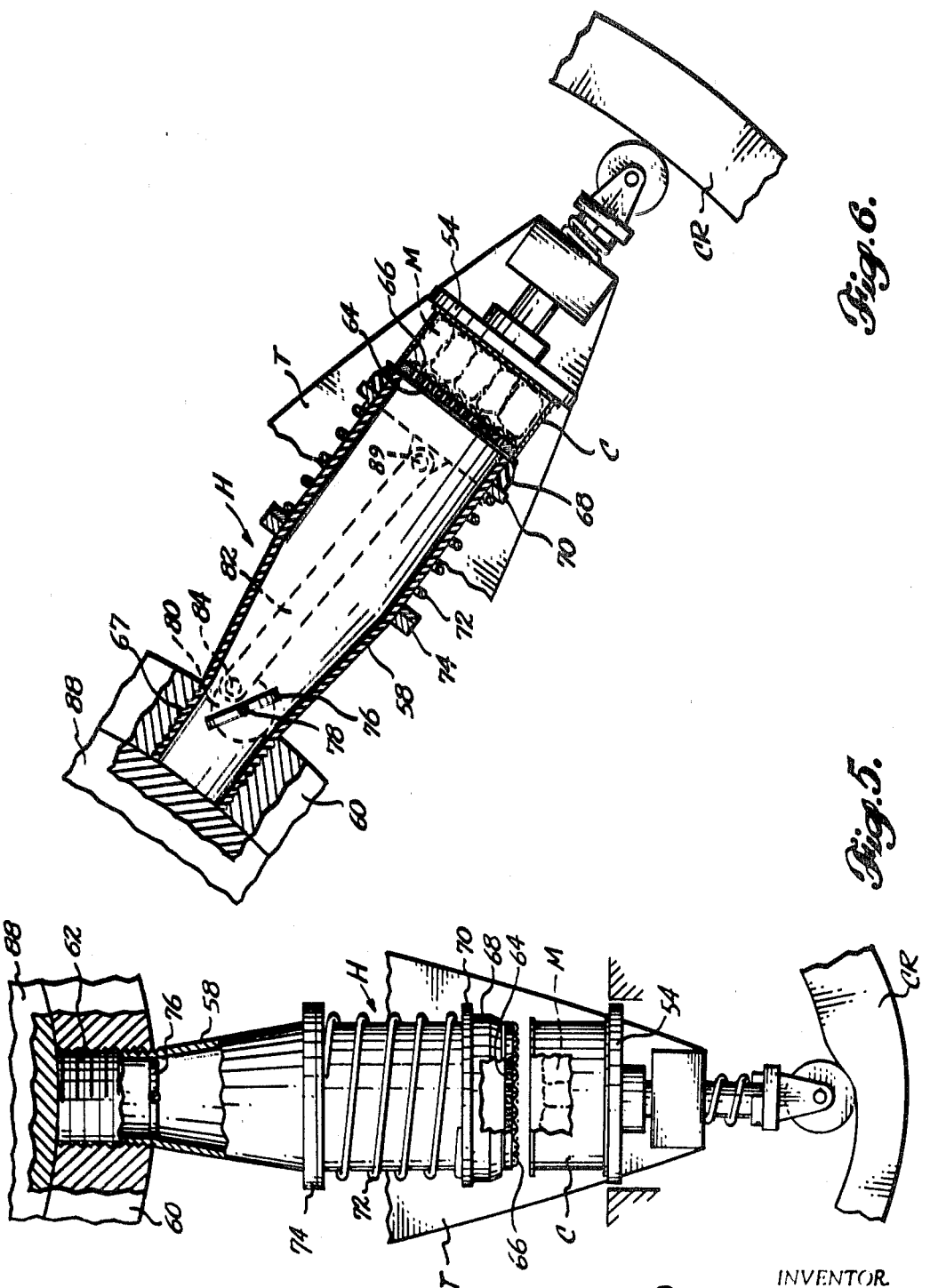

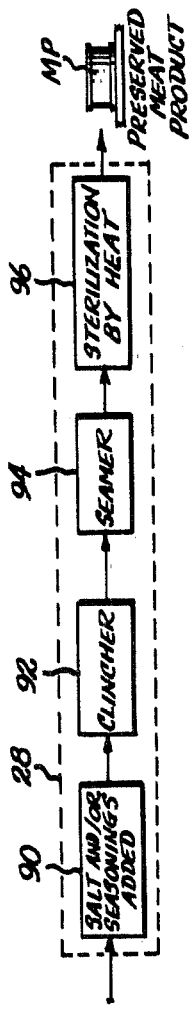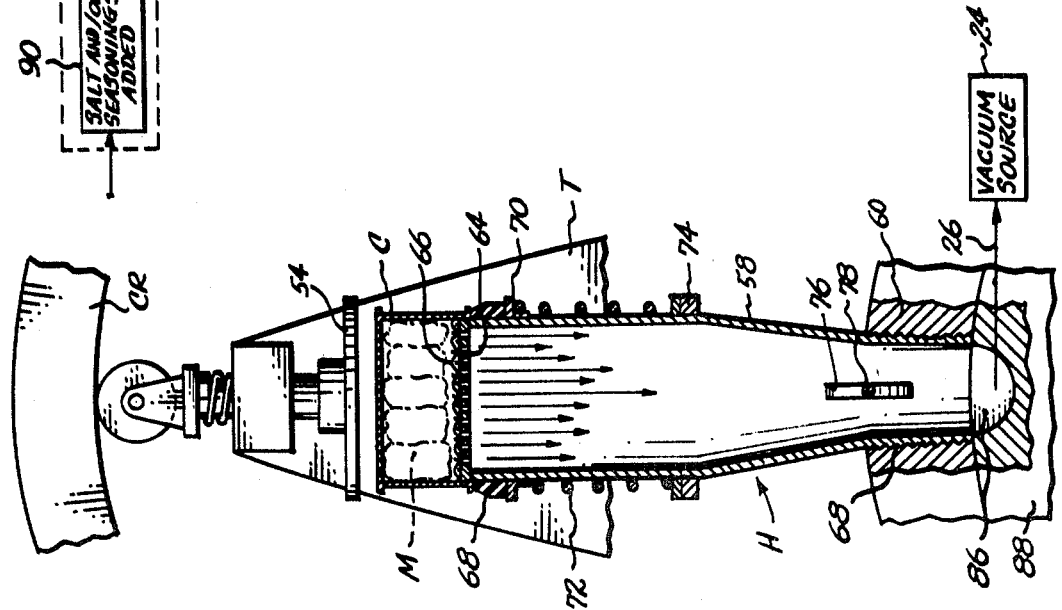

3,603,240

MEAT TREATING APPARATUS

CROSS-REFERENCE TO RELATED APPLICATION

This is a division of my copending application Ser. No. 500,522, filed Oct. 22, 1965, entitled Method and Product Aspects of Meat Preservation, and now U.S. Pat. No. 3,476,569, granted Nov. 4, 1969.

BACKGROUND OF THE INVENTION

The present invention relates to the preservation of edible animal meat for eventual use as food by humans or domesticated animals, and and more particularly to apparatus for use in a process for removing certain flavor and spoilage influencing substances from uncooked animal meat prior to its final preservation.

My aforementioned U.S. Pat. No. 3,476,569 relates to a method for the removal of the undesirable flavor and spoilage influencing substances from animal meat prior to final preservation of the same (e.g. by canning, freezing, radiation treatment, etc.), which method is applicable to nearly all species of animal meat, with essentially the only variation in treatment from one type of meat to another involving merely the extent or duration of treatment.

The removal of such substances improves the taste, odor, color, appearance and general overall condition of the preserved meat product. Generally speaking, the method comprises a technique of effecting the rapid and forceful removal of melted fats and various enzymic liquescent constituents, in predetermined amounts, from the cells and interstices of the meat after it has been packed into cans in a raw or uncooked state and before any other ingredients, such as flavorings and/or seasonings, have been added and the cans closed for final cooking and sterilization. The removal of such substances in this manner also has a beneficial effect on the keeping quality of the preserved product and permits the entire canning process to be conducted more rapidly.

Briefly, the method of my U.S. Pat. No. 3,476,569 involves the following steps: Uncooked animal meat which is to be preserved is first cut into pieces and placed into open top containers, and then while in the containers is subjected to a heat and pressure. The amount of heat applied is insufficient to "cook" the meat, according to the commonly accepted meaning of the term. Preferably the heating under pressure is done by injecting high velocity jets of steam through the open top of each container, directly into the meat, while confining at least a portion of the steam and evolved vapors and gases in the container, whereby the pressure builds up in the container to a value substantially above atmospheric pressure. The penetration of the high velocity jets of high temperature steam into the meat is swift and deep, resulting in a fast and efficient heat-transfer. The heat and pressure combine to disrupt the structural balance of the meat tissues, causing the flavor and spoilage influencing substances in the cells and tissues of the meat to boil and at least partially vaporize. The vapors and gases which are produced burst through and tear or otherwise open up the tissues. At least a portion of the flavor and spoilage influencing substances are released from their bonds and made amenable to later removal as loose fluids. After sufficient heating of the meat, the steam injection is discontinued and the steam and evolved vapors and gases confined in the container are released. This lowers the external pressure on the meat down to atmospheric pressure. As an immediate result, liquids still in the cells and tissues of the meat, which are still at super-atmospheric pressure, and are hot, will boil and burst through the meat tissues, as before, further disrupting the structure of tissues and breaking down the resistance which they offer to the removal of the unwanted flavor and spoilage influencing substances. Next, the meat, while it is still hot and has cooled little, if at all, is subjected to a vacuum, preferably by communicating the open top of the with a vacuum pump. The external pressure on the meat is rather abruptly reduced down to a value substantially below atmospheric pressure. This causes the liquids still in and about the cells and tissues of the meat which are at or slightly above atmospheric pressure, and are still hot, to boil and burst through the tissues, as before, causing an additional breakdown of the tissues. At this stage, substantially all the unwanted flavor and spoilage influencing substances are present in the container as loose liquids and/or free gases and vapors (hereinafter sometimes more simply termed "loose fluids"), or have previously left the container as free vapors or gases. The remaining loose liquids and free vapors and gases are then extracted from the container and its contents, preferably by at least partially inverting the container while its open top is still in communication with the source of vacuum. Finally the meat product is preserved such as by canning, freezing, radiation treatment, etc.

The principal object and feature of the present invention is to provide a mechanism for heating meat packed in open top containers, said mechanism comprising a steam injection head having a central steam chamber with inlet and outlet ends, conduit means for delivering steam into said chamber through the inlet end, and a nozzle plate extending across the outlet end of said steam chamber and including a plurality of steam jet forming nozzles; means supporting an open top container of uncooked animal meat in registry with said nozzle plate, whereby the high velocity jets of high temperature steam may penetrate swiftly and deeply into the meat, so as to effect a fast and efficient heat-transfer. The nozzle plate is preferably provided with a fluid seal of rubber or rubberlike material in sealing engagement with the rim or lip of the open top container. During use of the mechanism the nozzle plate serves to confine in the container at least a portion of the steam and the vapors and gases which are evolved from the meat as a result of the heating, so that the heating is conducted at super-atmospheric pressure, as previously mentioned. Preferably the annular peripheral portion of the nozzle plate is formed to include an annular array of vent openings, located radially inboard of the seal, which vent openings communicate the interior of the container with the atmosphere and serve as a control on the value of the pressure in the container. The combined total area of such vent openings is less than the combined area of the steam jet forming nozzles. Preferably the vent openings discharge into an annular exhaust chamber which surrounds the steam chamber and has an outlet directly or indirectly in communication with the atmosphere. The conduit means for supplying steam to the steam chamber contains valve means which is selectively operable to either communicate the steam chamber with the steam source or alternatively with the atmosphere.

Reference is made to my aforementioned U.S. Pat. No. 3,476,569 for a discussion of the various objects and advantages of the method and of certain types of meat to which the method is particularly applicable.

As used herein, the term "fluids" means both liquids and gases.

These and other features, advantages, objects and capabilities of the present invention will be apparent from the following detailed description of the method and a preferred form of the apparatus of the invention, which is used for performing certain steps of said method, taken together with the accompanying illustrations.

BRIEF DESCRIPTION OF DRAWING FIGURES

In the drawing like numerals refer to like parts, and:

Figures 2, 3, 4:
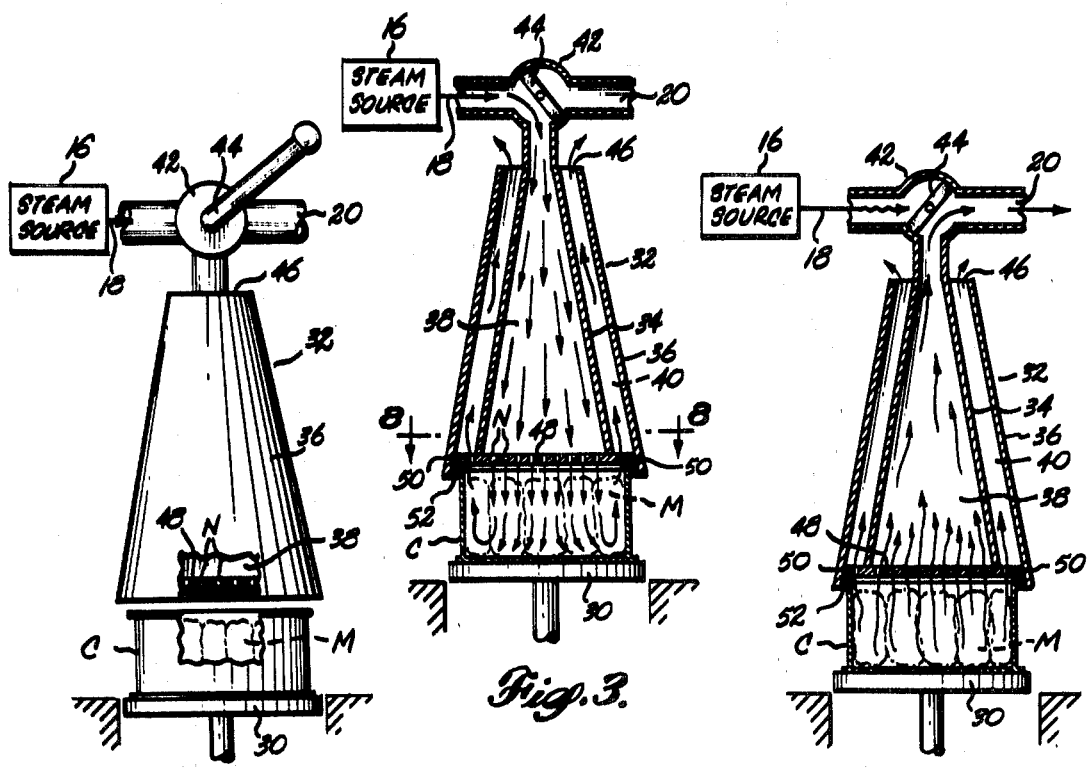
FIG. 2 is a partially schematic elevational view, with parts cut away, of a steam injection head according to this invention, the lower end of said head being concentrically related to an open top container that is substantially full of uncooked animal meat.
Figure 8:
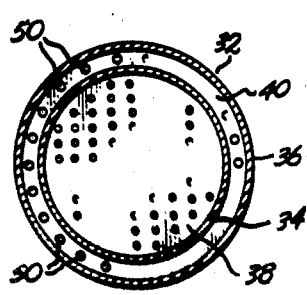
Figure 9:
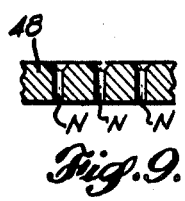
Figure 10:
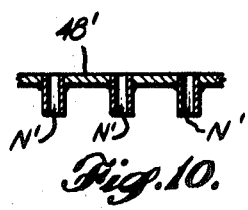

FIG. 3 is a view similar to FIG. 2, but showing the steam injection head and container in section and showing the container in a raised position, with its upper edge in engagement with an annular seal carried by the nozzle plate, such view showing the steam chamber in communication with a steam source, and depicting generally, by arrows, the flow pattern of the high velocity jets of steam into the uncooked animal meat and the path of some of the steam and evolved vapors and gases out from the container through the circular array of vent openings in the nozzle plate which communicate the interior of the container with the annular exhaust chamber surrounding the central steam chamber and discharging to the atmosphere;

FIG. 4 is a view like FIG. 3, but with the three-way valve rotated 90° so as to block off the steam supply conduit and communicate the steam chamber (and hence the interior of the container) with the atmosphere, such view depicting generally, by arrows, the outflow of the once confined steam, vapors and gases from the container through both the steam and exhaust chambers to the atmosphere;

FIG. 5 is an elevational view of the extraction head of a representative form of extraction machine usable in the performance of the process, in readiness to receive a container for extraction, with parts of said extraction head and said container being broken away for clarity of illustration;

FIG. 6 is a view similar to FIG. 5, but showing the extraction head and container in longitudinal section and the open top of the container raised into engagement with an annular seal carried by the inlet end portion of the extraction head;

FIG. 7 is a view like FIG. 6, but showing the extraction head and the container and its contents in an inverted position with arrows being used to show generally the direction of pull of the vacuum;

FIG. 8 is a transverse sectional view of the steam injection head, taken substantially along line 8—8 of FIG. 3, presenting the nozzle plate in top plan;

FIG. 9 is an enlarged scale fragmentary sectional view, taken through a typical form of nozzle plate constructed according to the present invention, such form involving a relatively thick plate drilled or otherwise formed to include a plurality of substantially parallel, relatively narrow passageways, which constitute the nozzles for forming the steam into high velocity, deeply penetrating jets of fluid;

FIG. 10 is a view like FIG 9 but of a modified form of nozzle plate, wherein the plate itself is relatively thin and carries a plurality of elongated, relatively small diameter tubes which constitute the nozzles;

FIG. 11 is a sectional view taken through the supporting hub and the valve plug of the extraction mechanism of FIGS. 5–7; and FIG. 12 is a schematic or flow plan view of a canning operation representing a typical manner of preserving the meat products of the invention subsequent to the removal therefrom of the undesirable flavor and spoilage influencing substances.

DESCRIPTION OF THE PREFERRED EMBODIMENTS

Figure 1:
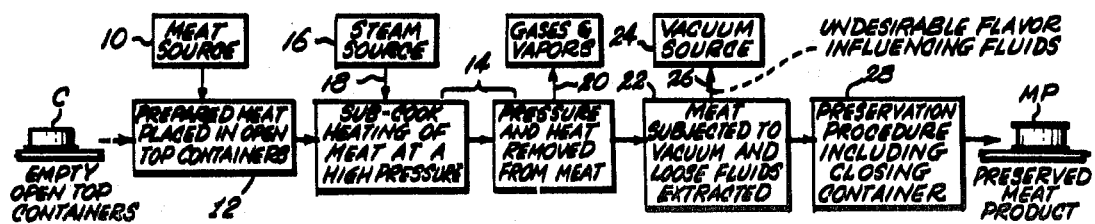
FIG. 1 is a schematic view, or flow plan, diagrammatically illustrating the progress of a container of meat through the various stages or steps characterizing the method.

As diagrammatically illustrated in FIG. 1, the animal meat, which has been previously butchered, cleaned and cut into pieces, is taken from a source 10 and at a filling station 12 is suitably placed into open top containers C. Each container C is then moved from the filling station 12 to a high pressure and subcook heating station 14 whereat the temperature of the meat M, and the pressure in the container C on the meat M are both raised, preferably by injecting steam from a steam source 16 through the open top of the container C directly into the meat M while at the same time confining at least some of the steam and the vapors and gases from the meat, evolved as a result of the heating, in the container, as will be later explained in greater detail. After a suitable amount of time, the heating is discontinued and the pressure on the meat M is reduced to atmospheric pressure by releasing the steam and evolved vapors and gases from the container C. As will hereinafter be explained in more detail, the heat, pressure and sudden reduction of pressure all act to break down meat tissues and remove the barriers which they offer to the escape of flavor and spoilage influencing substances which are sealed in the meat cells and tissues. Next the meat is moved to a low pressure and extraction station 22 and while still hot is subjected to a vacuum from a source 24 by way of conduit means 26. The pressure in the container externally of the meat is lowered to a value substantially below atmospheric pressure. This creates a pressure differential across the tissues of the meat since the liquids in the meat are still at is slightly above atmospheric pressure. As a result, these liquids (which are still hot) boil, and the vapors and gases which are evolved tend to break through and further tenderize the meat tissues. The container C is at least partially inverted when connected to the vacuum source so that substantially all of the loose liquids and free vapors and gases are removed or extracted from the meat M and removed from the container C. Finally the container C and its contents are moved to station 28 for preservation, as by canning, freezing, radiation treatment, etc. The preserved meat product MP is then ready for future use as a source of food.

The present invention will now be described in greater detail in conjunction with a canning operation, with specific reference being made to the remaining figures of the drawing.

In FIG. 2 an open top metal can C containing a species of uncooked animal meat, such as tunafish, for example, is shown supported on a pad 30 below the outlet end of a steam injection head 32, forming a part of the mechanism at station 14 (FIG. 1). As clearly shown in FIGS. 3 and 4, the steam injection head 32 comprises concentrically arranged inner and outer frustoconical walls 34, 36 respectively, forming a central steam chamber 38 and an annular exhaust chamber 40 surrounding said steam chamber 38. The inlet end of the steam chamber 38 may be communicated through a three-way valve 42 with either conduit means 18 leading from the steam source 16 or vent passageway 20 leading to the atmosphere, by operator or automatic movement of the valve plug 44. The outlet end 46 of the exhaust chamber 40 is shown open to the atmosphere, but may be indirectly communicated to the atmosphere through conduit means. A nozzle plate 48 is provided at the lower end of steam injection head 32, as shown. As perhaps best shown in FIG. 8, the central portion of nozzle plate 48 (the portion within the confines of inner wall 34) is provided with a plurality of steam jet forming nozzles N designed to transform the steam into high velocity jets capable of penetrating swiftly and deeply into the interior of the meat M.

FIGS. 9 and 10 illustrate two typical forms which the nozzles may take. In FIG. 9, the nozzle plate 48 is shown as being relatively thick with the nozzles constituting relatively small diameter bores drilled or otherwise formed in the nozzle plate 48. In the form of FIG. 10, the nozzle plate 48' is substantially thinner, and the nozzles N' are individual nozzle tubes joined to or formed integral with the nozzle plate 48'. Such nozzle tubes are formed to include a central passageway of small diameter which function the same as the bores formed in the nozzle plate 48. A plurality of vent openings 50 are formed in the annular portion of nozzle plate 48 (or 48') and are disposed between inner wall 34 and outer wall 36. An annular gasket 52 of rubber or rubberlike material is provided at the lower side of nozzle plate 48, outwardly of the steam escape ports 50 and adjacent the portion of wall 36 extending below nozzle plate 48.

The steam injection head 32 is preferably stationary, and the can supporting pad 30 is preferably raiseable, as by a hand operated jack, for example, so that the lip at the upper edge of the can C can be put into sealing engagement with the gasket 52, as is shown in FIGS. 3 and 4.

In operation, an open top container C into which pieces of uncooked animal meat M have been previously placed is positioned on pad 30 below the steam injection head 32. Next the pad 30 is raised so as to place the upper lip of container C in sealing engagement with the gasket 52. Thereafter, valve plug 44, which up to this time has occupied the vent position illustrated in FIG. 4, is turned to the steam delivery position shown in FIG. 3. The steam which is at a pressure of about 50 p.s.i.g. enters into and fills the steam chamber 38 and is then transformed by the nozzles N into high velocity (e.g. 200 m.p.h. or more) needlelike steam jets. Owing to their high velocity, the steam jets penetrate quickly and deeply into the tissues and cells of the meat M, providing a quick and efficient heat-transfer. After traveling through the meat some of the steam, and also some of the vapors and gases which are evolved as a result of the meat being heated, leave the container C through through the vent openings 50. The flow of steam into the container C through the nozzles N is much greater than the outflow of steam and evolved vapors and gases from the container C through the vent openings 50. This results in a nearly instantaneous buildup of pressure in the container C, which pressure is maintained as long as steam is being delivered. The vent openings 50 serve as pressure regulators and provide a control on the pressure in container C, preventing it from getting out of hand.

The heat and pressure combine to alter the tissue structure; bonds are broken and rings opened in the protein cells, with some dissociation and loss of structure. A general swelling of the tissues occurs, and this is accompanied by the translocation of some of the intramuscular fat from the endomysial and perimysial fat cells into the interstitial spaces of the meat. The blood is hemolized and there is a great degree of dispersion of extracellular tissue fluid throughout the muscle fiber and connective tissue. The structural balance of the tissue is disrupted generally and the environment that is favorable to the propagation of bacterial micro-organisms is disturbed. The saturated fats are elevated to temperatures above their melting points and the viscosity of the fats and tissue fluids is greatly reduced. Some of the liquid and fatty constituents of the meat are heated to temperatures approaching or beyond their point of vaporization.

As the next step of the process, the valve plug 44 is turned from the position illustrated in FIG. 3 to the position illustrated in FIG. 4. This stops the delivery of steam to steam chamber 38 and at the same time vents the vaporous and gaseous contents (including the steam) to the atmosphere, resulting in a relatively sudden reduction of the pressure on the meat down to atmospheric pressure. This sudden release of the meat from the effects of super-atmospheric pressure sets up further turbulence in the liquid constituent of the meat, causing an additional breakdown of the tissues. The internal pressure of the meat, including that of the liquid and fatty substances in the cells and tissues, is still substantially above atmospheric pressure. Thus a pressure differential exists, and as a result the liquid and fatty substances in the meat boil and vaporize and then break through the tissues, causing their further breakdown. This continues until the internal pressure substantially equals the external pressure.

Next the pad 30 is lowered and the can C is moved directly to the extraction mechanism 22 whereat the meat M, while it is still hot and has cooled little, if at all, is subjected to a negative pressure or vacuum.

The extraction mechanism 22 is preferably like the one disclosed in and forming the subject matter of the Edward M. Borg and Robert McCarthy U.S. Pat. No. 3,226,843, issued Jan. 4, 1966. However, the extraction mechanism disclosed in and forming the subject matter of the Edward M. Borg U.S. Pat. No. 3,028,696, issued Apr. 10, 1962, and entitled "Extracting Machine for Use in Fish Canning," is also capable of performing the extraction step of the process provided by the present invention. For purposes of typical illustration, the extraction step will be described as being performed by a mechanism of the type disclosed in the said U.S. Pat. No. 3,028,969. For background providing purposes the disclosures of said U.S. Pat. Nos. 3,028,969 and 3,226,843 are hereby expressly incorporated herein by reference.

Referring now to FIG. 5, and proceeding with a description of the method of the present invention, the open top can C of meat M is shown supported on a can lifting pad 54 below the outer end of an extracting head H. Each extracting head H comprises a cylindrical or tubular body portion 58 that is fixed relative to a turret T, radially thereof, by a supporting hub 60 of conical form that is fixed coaxially to the front face of the turret T. The inner end portion of the tubular body 58 is of reduced diameter and threads, in a vacuum sealed joint, into an opening 62 in the forward end portion of the hub 60. At its outer end the tubular body 58 is closed by a flat perforated plate 64 overlaid with a fine mesh screen 66, or some other suitable foraminous member. The diameter of the outer end portion of the tubular body 58 is such as to be snugly received within the open end of the can C (FIG. 6).

Closely adjacent its outer end, the tubular body 58 has a resilient gasket 68 of rubber or rubberlike material fitted thereto, and this is backed by a metal ring 70 slidably applied about the body 58 to yieldingly resist inward movement of the gasket. The ring 70 is backed by a coil spring 72, which surrounds the body 58, and at its inner end, seats against a metal ring 74 that is fixed about the body 58. This arrangement of parts provides that the outer end of the body 58 will enter the can and the gasket 68 will effect an air sealed connection with the lip of the can.

As is shown in FIG. 5, the body 58 is equipped within its restricted inner end portion with a butterfly valve 76 fixed on a rotatable valve stem 78 that extends through to one side of the body and is there equipped with a wheel 80. A link 82 is pivotally connected eccentrically at its outboard end to this wheel as at 84, and at its inner end is pivotally attached as at 85 to the ring 70.

In operation, as the turret rotates from the bottom position shown in FIG. 5 the can pad 54 is raised by cam means including a cam ring CR and the upper lip of can C, disposed on said pad 54, is moved into sealing engagement with the gasket 68. The lifting of the can C by the cam pad 54 also slightly lifts the gasket 68 and ring 70 against the resistance afforded by the coil spring 72, causing the valve 76 to be slightly opened.

The source of vacuum comprises a closed liquid receptacle and vacuum tank 24 mounted on a base. Suitable vacuum is maintained within the tank by a vacuum pump connected therewith. By suitable conduit means 26 the closed liquid receptacle and vacuum tank 24 is put in communication with the opening 86 formed in supporting hub 88 (FIG. 7).

As the turret T continues to rotate, the inner end of the vacuumizing or extraction head H is caused to pass into registration with the vacuumizing opening 86 of supporting hub 60 and vacuum is applied through valve 76 to the can C. This effects the extraction of the loose liquids from the meat and causes the extracted liquids to flow through the opening 86 into the vacuum tank 24. With the full force of vacuum applied, the valve 76 is caused to be fully opened, whereby the can C is pulled away from the pad 54, as shown by FIG. 7, but held against displacement from the head H.

The application of vacuum has an additional effect. The interior of the container is subjected to a subatmospheric pressure at a time when the internal pressure of the meat, including that of the liquid and fatty flavor and spoilage substances still in the meat, is at or slightly above atmospheric pressure, and such meat is still hot. As a result, a new pressure differential is created and the vaporization temperature of the liquid substance is reduced, and such liquids begin to boil and burst through the tissues, causing still a further breakdown of the tissues (i.e. in addition to the breakdown of the tissues caused by the prior heating under pressure and sudden reduction of pressure).

In the arrangement illustrated, wherein the lip at the open end of the can C is in sealing engagement with the gasket 68 of the extraction head H, the loose liquids existing in the container will not be removed unless the extraction head is at least partially inverted.

With the passage of the extraction head H past the opening 86 in valve plug 88, the can C will be retained on the head H by vacuum pull until it arrives at a discharge point at which the vacuum in the extraction head H is fully relieved and releases the can. This relief of vacuum is effected by the passing of the inner end of the opening 62, in which the extraction head is threaded, into registration with a vent port 89 formed in the valve plug 88 and leading to the atmosphere.

As diagrammatically illustrated in FIG. 12, after leaving the extraction mechanism 22, the can C is moved on to the station 90 whereat oil, salt, vegetable extract and/or other seasonings or flavorings may be added to the can C after which said can C is passed through a clincher 92 and a seamer 94, and is then cooked and heat sterilized at station 96, and finally discharged as preserved meat product MP.

Although the method has been specifically described in connection with a canning operation, it is to be understood that the particular manner of final preservation of the meat product is not critical, and any of the usual techniques of preserving food may be employed. Thus the product treated may be preserved by other techniques, as by freezing, ionizing radiation, or nonionizing radiation, for example. The term "container" is used herein to mean any type of container found suitable to the various conventional methods of food preservation, and they may be of metal (i.e. "cans"), glass, plastic, treated paper, etc.

Specific examples of the method are disclosed in my aforementioned U.S. Pat. No. 3,476,569. These examples and detailed discussions relating to the results obtained are not repeated here because they are not necessary to an understanding of the apparatus of this invention.

What is claimed is:

1. A mechanism for heating and pressurizing meat sections packed in an open top container, comprising: a injection head having an inlet and a foraminous outlet means placeable over the open top of the container; means for delivering a hot palatable fluid into said head, to flow therefrom through the outlet plate and into the meat; means for urging said open top container and said outlet plate relatively together, such that the outlet plate will serve to confine fluid and evolved vapors and gases from the meat in the container so that the pressure in said container is raised and the heating of the meat is done at superatmospheric pressure; and means for venting the fluid and any evolved gases or vapors from said container, through said head, while said outlet plate and the open top container are together, following stoppage of fluid delivery.

2. A mechanism according to claim 1, wherein said outlet plate further includes an annular seal in sealing engagement with the rim edge of the open top container.

3. A mechanism according to claim 1, wherein said outlet plate is formed to include a generally annular array of vent openings surrounding the said fluid emitting openings, which vent openings communicate the interior of said container with the atmosphere.

4. A mechanism according to claim 3, wherein the combined area of said vent openings is less than the combined area of said fluid emitting openings.

5. A mechanism according to claim 3, wherein an annular exhaust chamber surrounds said fluid chamber and said vent openings in the outlet plate discharge into said exhaust chamber, and said exhaust chamber opens to the atmosphere.

6. A mechanism according to claim 1, wherein said conduit means for delivering fluid into the fluid chamber includes valve means for selectively discontinuing the delivery of steam to the fluid chamber and venting said fluid chamber, the container and the contents of the container to the atmosphere.

7. A mechanism according to claim 6, wherein said outlet plate further includes an annular seal in sealing engagement with the rim edge of the open top container.